US009738528B2

(12) United States Patent
Lee et al.

(10) Patent No.: US 9,738,528 B2
(45) Date of Patent: Aug. 22, 2017

(54) GRAPHENE, METHOD AND APPARATUS FOR PREPARING GRAPHENE

(71) Applicant: HANWHA CHEMICAL CORPORATION, Seoul (KR)

(72) Inventors: Jin Seo Lee, Yongin (KR); Seung Hoe Do, Daejeon (KR); Seong Yun Jeon, Daejeon (KR); Jung Ho Kong, Daejeon (KR)

(73) Assignee: HANWHA CHEMICAL CORPORATION, Seoul (KR)

( * ) Notice: Subject to any disclaimer, the term of this patent is extended or adjusted under 35 U.S.C. 154(b) by 0 days.

(21) Appl. No.: 14/907,858

(22) PCT Filed: Aug. 20, 2014

(86) PCT No.: PCT/KR2014/007732
§ 371 (c)(1),
(2) Date: Jan. 27, 2016

(87) PCT Pub. No.: WO2015/026157
PCT Pub. Date: Feb. 26, 2015

(65) Prior Publication Data
US 2016/0200581 A1    Jul. 14, 2016

(30) Foreign Application Priority Data
Aug. 21, 2013  (KR) .................. 10-2013-0099287

(51) Int. Cl.
*C01B 31/04*     (2006.01)
*B01J 19/24*     (2006.01)
*B01J 3/00*      (2006.01)

(52) U.S. Cl.
CPC .......... *C01B 31/0492* (2013.01); *B01J 3/008* (2013.01); *B01J 19/24* (2013.01); *C01B 31/0438* (2013.01); *C01B 31/0446* (2013.01); *B01J 2219/00103* (2013.01); *C01B 2204/22* (2013.01); *C01B 2204/30* (2013.01); *C01B 2204/32* (2013.01); *C01P 2002/88* (2013.01); *C01P 2006/40* (2013.01); *C01P 2006/80* (2013.01); *Y02P 20/544* (2015.11)

(58) Field of Classification Search
CPC . C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32
USPC ................. 423/448; 422/129, 187
See application file for complete search history.

(56) References Cited

U.S. PATENT DOCUMENTS

| 8,187,566 | B2 | 5/2012 | Lee | |
|---|---|---|---|---|
| 9,051,179 | B2 | 6/2015 | Lee | |
| 2009/0297424 | A1* | 12/2009 | Lee ....................... | B82Y 30/00 423/318 |
| 2010/0044646 | A1 | 2/2010 | Zhamu | |
| 2010/0080748 | A1 | 4/2010 | Han et al. | |
| 2010/0301212 | A1 | 12/2010 | Dato et al. | |
| 2011/0114897 | A1 | 5/2011 | Aksay | |
| 2012/0171108 | A1 | 7/2012 | Kim et al. | |
| 2012/0277360 | A1* | 11/2012 | Scheffer .............. | C09D 177/00 524/237 |
| 2013/0108540 | A1 | 5/2013 | Baek | |

FOREIGN PATENT DOCUMENTS

| CN | 101565181 | 10/2009 |
|---|---|---|
| CN | 101591017 | 12/2009 |
| CN | 101712469 | 5/2010 |
| CN | 102515155 | 6/2012 |
| JP | 2009-263226 | 11/2009 |
| JP | 2013-014514 | 1/2013 |
| JP | 2013-133257 | 7/2013 |
| KR | 10-2009-0103614 | 10/2009 |
| KR | 10-2009-0124051 | 12/2009 |
| KR | 10-2010-0036572 | 4/2010 |
| KR | 10-1001385 | 12/2010 |
| KR | 10-2011-0001557 | 1/2011 |
| KR | 10-2012-0079435 | 7/2012 |

(Continued)

OTHER PUBLICATIONS

Stankovich, et al., Stable aqueous dispersions of graphitic nanoplatelets via the reduction of exfoliated graphite oxide in the presence of poly(sodium 4-styrenesulfonate), J. Mater. Chem. 2006; 16: 155-158.*
Search Report & Written Opinion, Patent Cooperation Treaty, Application No. PCT/KR2014/007732, Nov. 26, 2014.
Songfeng Pei, Hui-Ming Cheng, "The reduction of graphene oxide", Carbon 50.9, Aug. 2012, pp. 3210-3228.
European Patent Office, Partial Supplementary European Search Report of Application No. 14837898.7, Apr. 6, 2017.
Victor Chabot et al., "High yield production and purification of few layer graphene by Gum Arabic assisted physical sonication", Scientific Reports vol. 3, Mar. 12, 2013. pp. 1-7.

*Primary Examiner* — Daniel C McCracken
(74) *Attorney, Agent, or Firm* — Lex IP Meister, PLLC.

(57) ABSTRACT

There are provided a graphene having an oxygen atom content in a predetermined range or less and a carbon/oxygen weight ratio in a specific range to show excellent electrical and thermal conductivity properties, and a barrier property, and a method and an apparatus for preparing the graphene having excellent electrical and thermal conductivity properties and a barrier property by using a subcritical-state fluid or a supercritical-state fluid. According to the method and the apparatus for preparing the graphene, impurities such as graphene oxide, and the like, may be effectively removed, such that uniformity of the graphene to be prepared may be increased, and therefore, the graphene which is highly applicable as materials throughout the industry may be mass-produced.

19 Claims, 7 Drawing Sheets

(56) References Cited

FOREIGN PATENT DOCUMENTS

| KR | 10-1254173 | 4/2013 |
| KR | 10-2013-0050048 | 5/2013 |
| TW | 201002614 | 1/2010 |
| TW | 201004867 | 2/2010 |
| TW | 201012748 | 4/2010 |
| WO | 2009-123771 | 10/2009 |

\* cited by examiner

[FIG. 1]
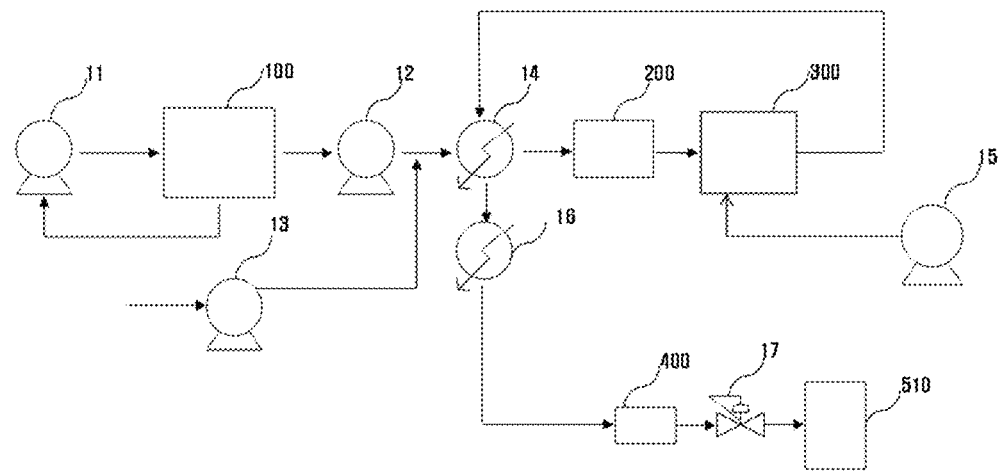
[FIG. 2]
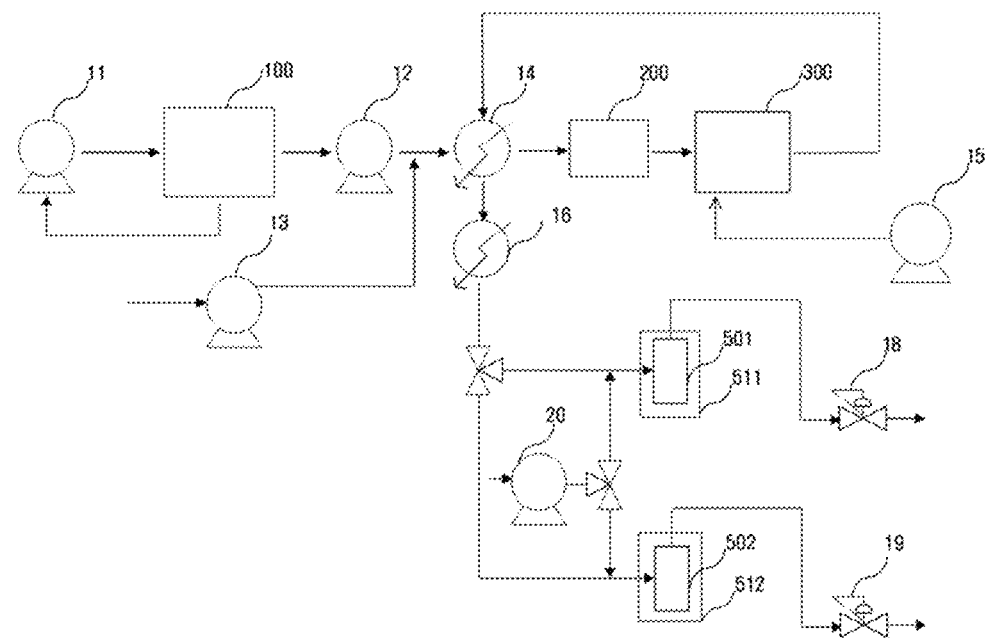

[FIG. 3]
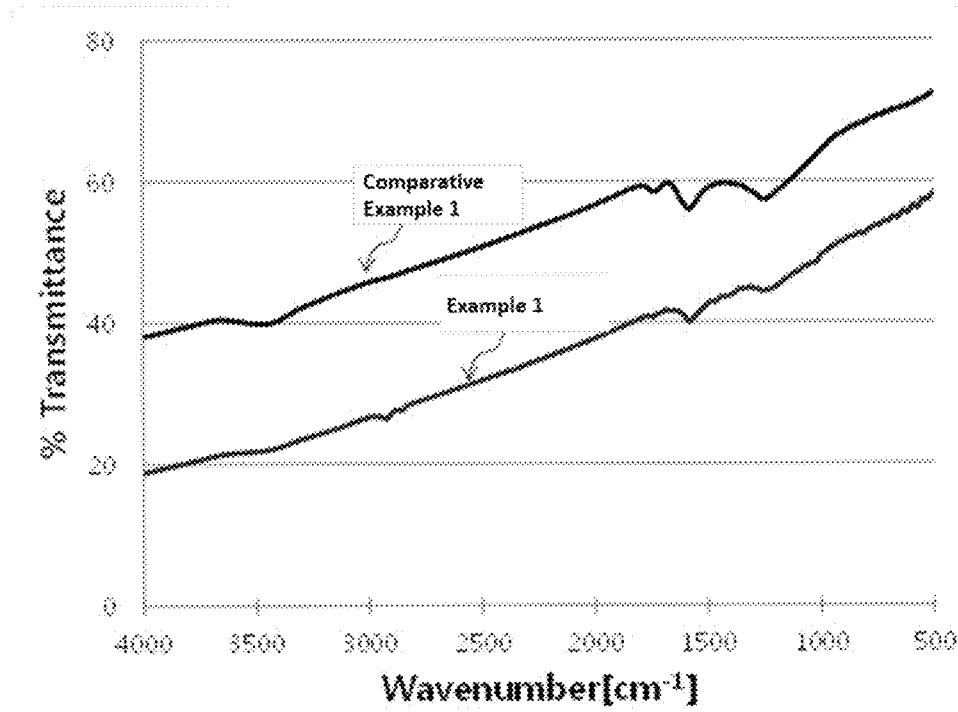
[FIG. 4]
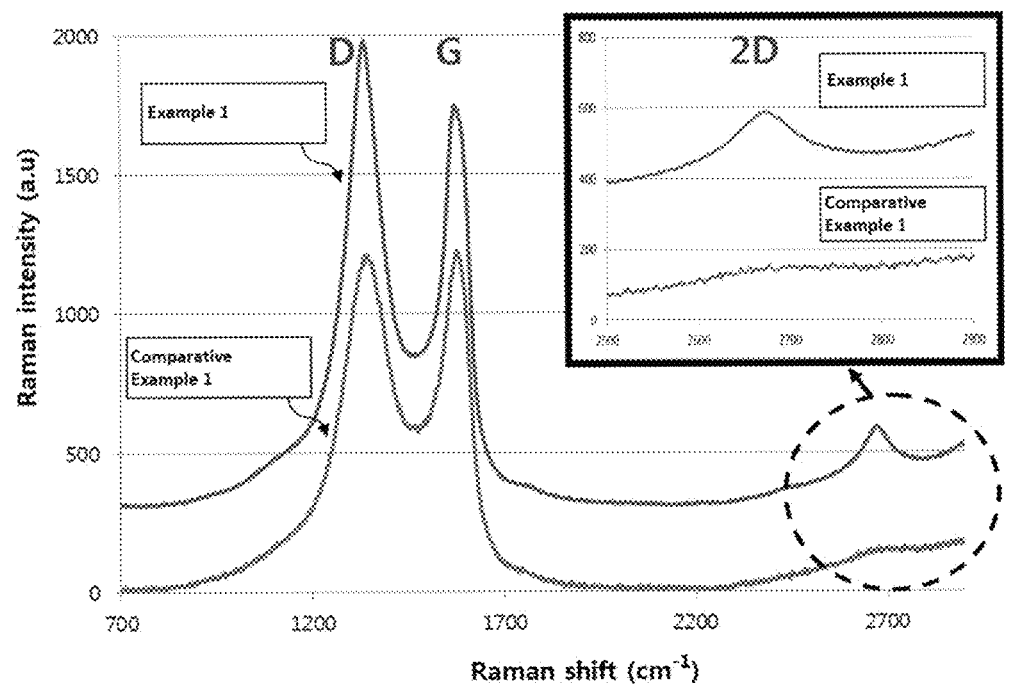

[FIG. 5]
Example 1
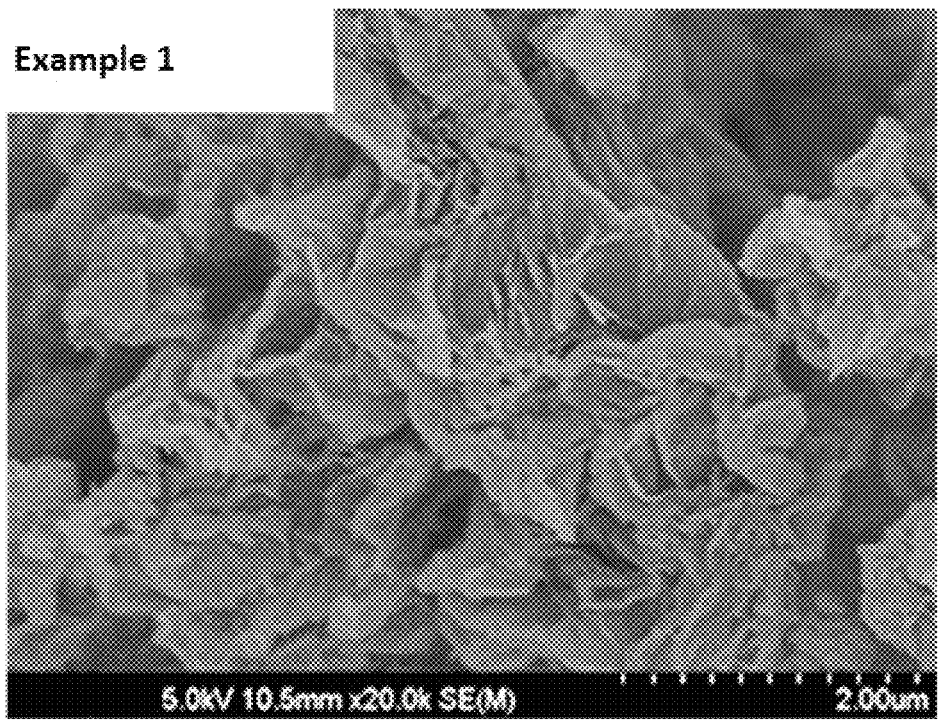
Comparative Example 1
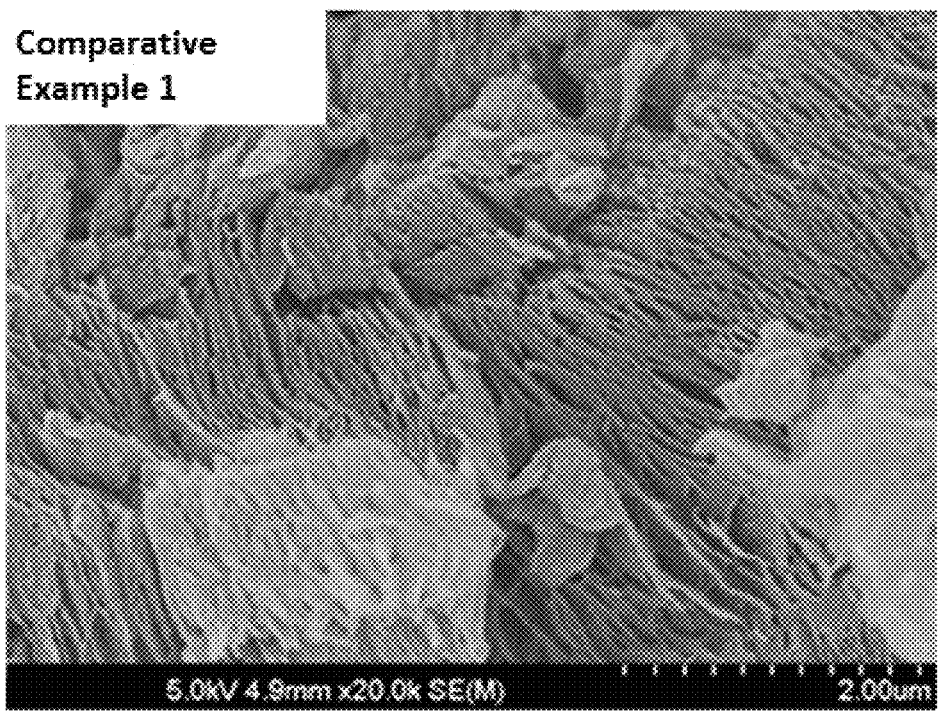

[FIG. 6]
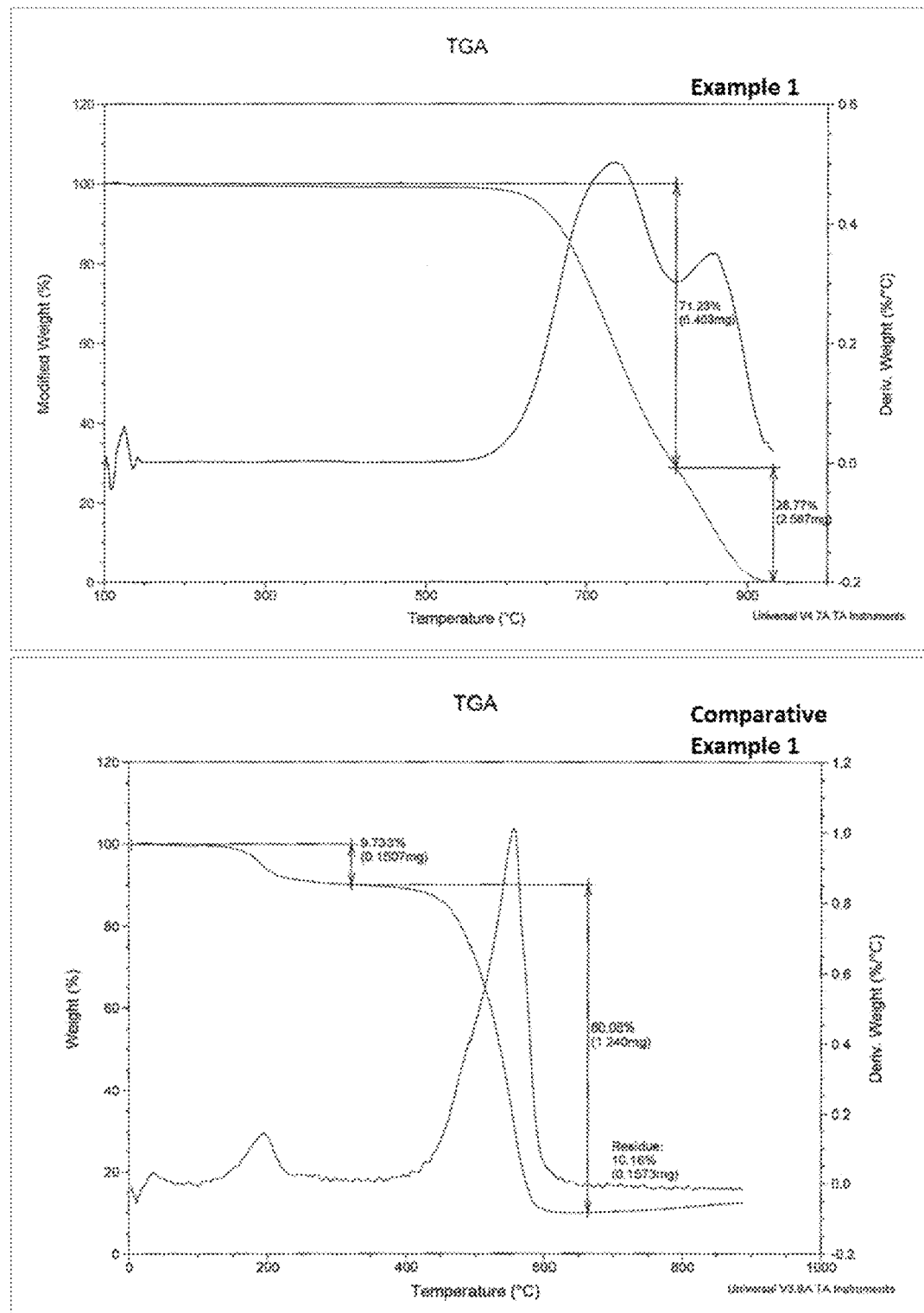

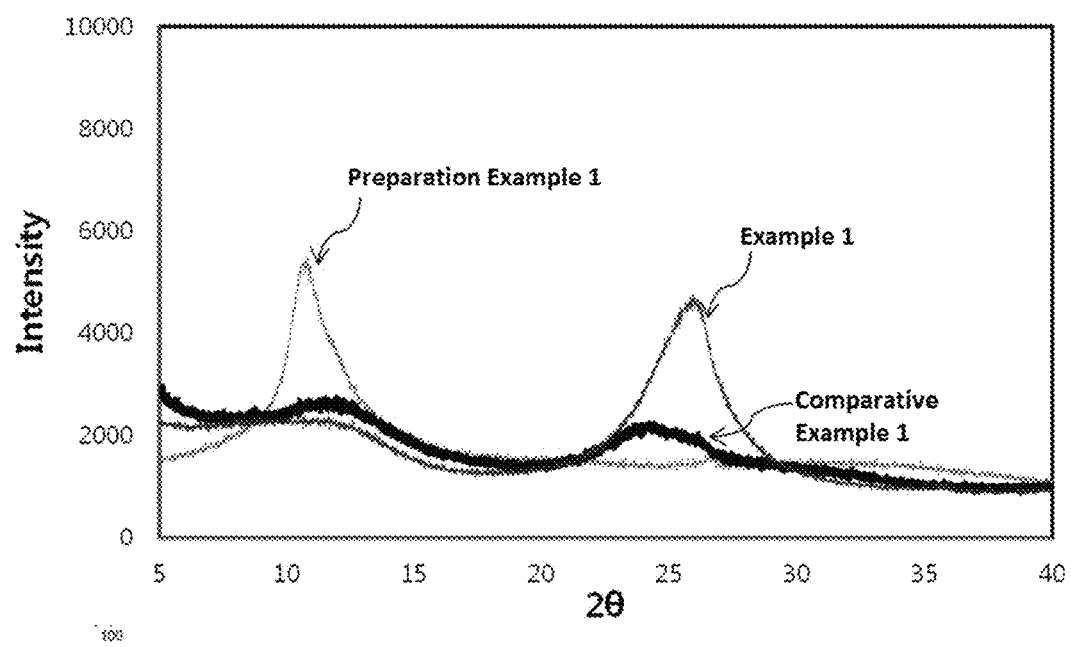
[FIG. 7]

[FIG. 8]
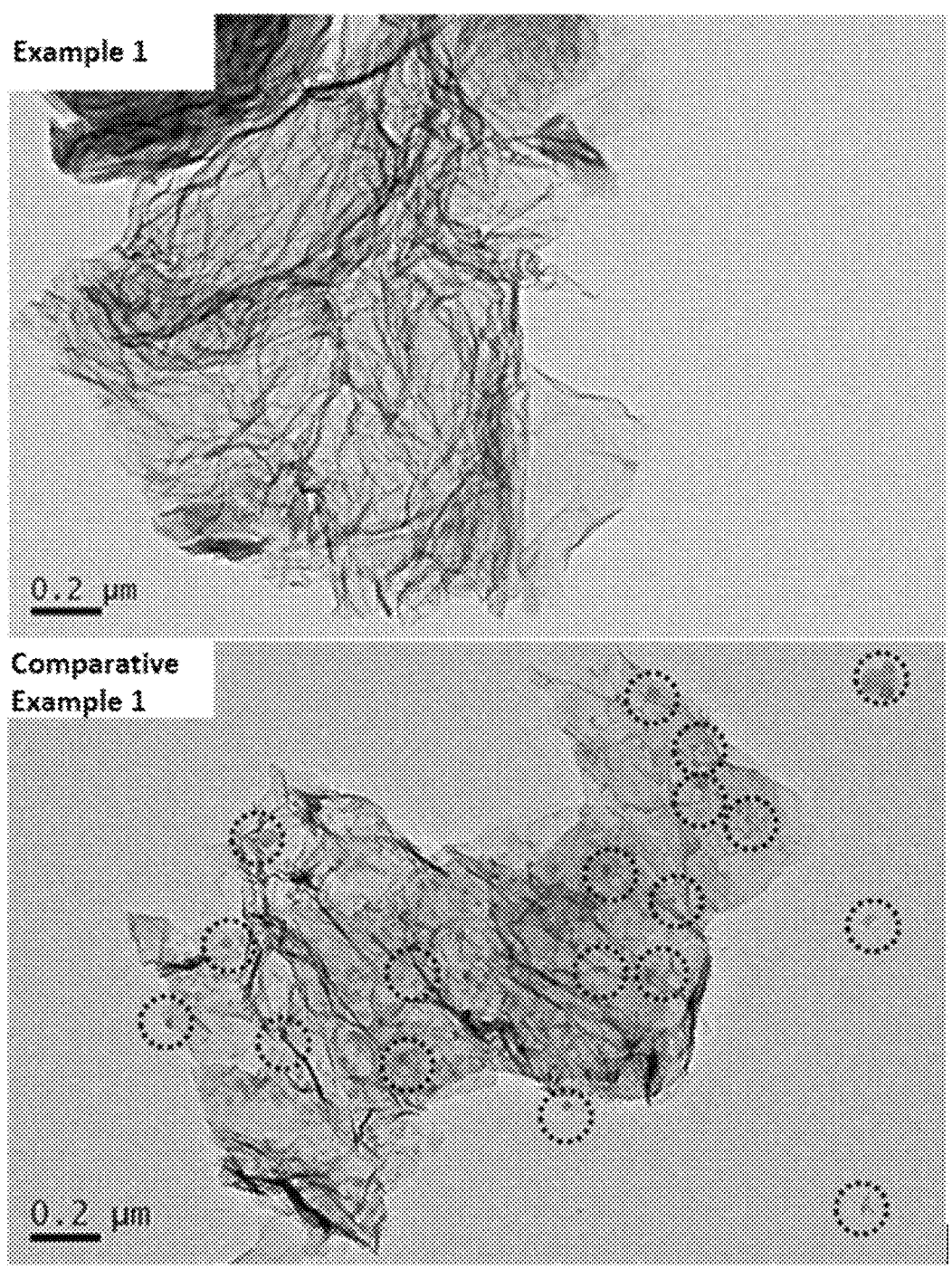

[FIG. 9]
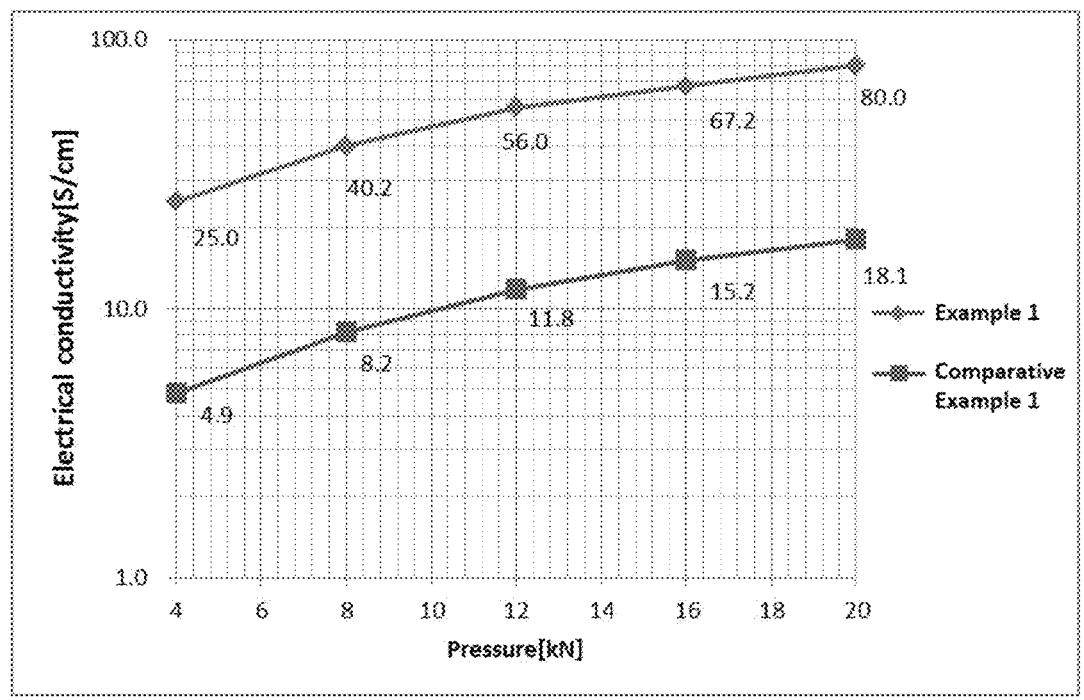

GRAPHENE, METHOD AND APPARATUS FOR PREPARING GRAPHENE

TECHNICAL FIELD

The present invention relates to a graphene having a specific oxygen content, and a method and an apparatus for preparing the graphene, and more particularly, to a graphene having an oxygen atom content in a predetermined range or less and a carbon/oxygen weight ratio in a predetermined range to show excellent electrical and thermal conductivity properties, and a barrier property, and a method and an apparatus for preparing the graphene having excellent electrical and thermal conductivity properties and a barrier property by using a subcritical-state fluid or a supercritical-state fluid.

The application claims the benefit of Korean Patent Application No. 10-2013-0099287 filed in the Korean Intellectual Property Office on Aug. 21, 2013, the entire contents of which are incorporated herein by reference.

BACKGROUND ART

Graphene is a material in which carbon atoms of graphite which is a three-dimensional structured carbon allotrope naturally present in the natural world are arranged in a hexagonal plane structure which is a two-dimensional sheet form. Carbon atoms of the graphene form a $sp^2$ bond, and have a plane sheet form in a single atom thickness.

The graphene has significantly excellent electric conductivity and thermal conductivity, and physical properties such as excellent mechanical strength, flexibility, elasticity, quantized transparency depending on thickness, high specific surface area, and the like, may be explained by specific bonding structure of atoms present in the graphene. Three of four peripheral electrons of the carbons configuring the graphene form a $sp^2$ hybrid orbital to have a sigma bond, and remaining one electron and the surrounding carbon atoms form a pi bond to provide a hexagonal two-dimensional structure. Therefore, the graphene has a band structure which is different from other carbon allotropes, and does not have a band gap to exhibit excellent electric conductivity; however, the graphene is a semi-metal material in which state density of electrons at the Fermi level is 0, and therefore, may easily change electrical properties depending on whether or not it is doped.

Accordingly, since the graphene may be variously applied to automobile, energy, aerospace, construction, pharmaceutical, and steel fields as well as various electric electronic fields such as next-generation materials, capacitors, electromagnetic shielding materials, sensors, displays, and the like, which are replaceable for silicon electric electronic materials, research into a technology of utilizing the graphene in various fields has been largely conducted.

As a method for preparing the graphene, a scotch-tape method or a peel off method for exfoliating a graphene single layer from the graphite sheet using an adhesive tape, chemical vapor deposition, an epitaxial growth method by lamination on a silicon carbide substrate (SiC), thermal exfoliation of exfoliating the graphite by using heat, chemical oxidation and reduction, or the like, has been researched.

Among them, the chemical oxidation and reduction has advantages in that mass-production is possible, economical feasibility is provided, and various functional groups may be easily introduced into the graphene sheet. Meanwhile, in this method, reducing agents such as hydrazine, and the like, should be used for a deoxygenation reaction of graphene oxide, wherein most of these reducing agents are dangerous due to high corrosiveness, explosiveness, human toxicity, and the like, and the prepared graphene may include impurities, and the like, such that electric conductivity may be decreased.

Therefore, research into a method for preparing graphene having excellent physical properties such as electrical conductivity, and the like, even by economical, efficient, and low-risk processes, should be conducted.

RELATED ART DOCUMENT

[Patent Document] Korean Patent Publication No. 1,254,173

SUMMARY OF INVENTION

Technical Problem

The present invention has been made in an effort to provide a graphene having excellent physical properties such as electrical conductivity, thermal conductivity, a barrier property, and the like.

In addition, the present invention has been made in an effort to provide a method and an apparatus for preparing the graphene having excellent physical properties such as electrical conductivity, and the like, even by economical and efficient, and low-risk processes.

Solution to Problem

An exemplary embodiment of the present invention provides a graphene having 20 wt % or less of an oxygen content and 5 or more of a carbon/oxygen weight ratio (C/O ratio).

In addition, another exemplary embodiment of the present invention provides a method for preparing a graphene including forming a mixed solution including a graphite oxide, a solvent, a first oxidizing agent; and a sulfur compound or a nitrogen compound; forming the graphene by reacting the mixed solution under a subcritical condition or a supercritical condition of the solvent; and recovering the graphene.

Further, another exemplary embodiment of the present invention provides an apparatus for preparing a graphene including:

a mixing bath forming a pre-mixed solution by mixing a graphite oxide, a solvent, and a sulfur compound or a nitrogen compound; a first oxidizing agent feeding pump supplying a first oxidizing agent; a pre-heater pre-heating the pre-mixed solution and the first oxidizing agent supplied from the mixing bath and the first oxidizing agent feeding pump, respectively; a reactor connected to a rear end of the pre-heater, and generating a reaction of the mixed solution including the pre-mixed solution and the first oxidizing agent under a subcritical condition or a supercritical condition of the solvent; a cooler connected to a rear end of the reactor and cooling a product of the reaction; and recovering baths connected to a rear end of the cooler and recovering the graphene from the product.

Advantageous Effects of Invention

A graphene of the present invention has an oxygen atom content in a predetermined range or less and a carbon/oxygen weight ratio in a specific range to show excellent electrical conductivity.

In addition, according to a method and an apparatus for preparing the graphene of the present invention, impurities such as graphene oxide, and the like, may be effectively removed, such that uniformity of the graphene to be prepared may be increased, and therefore, the graphene which is highly applicable as materials throughout the industry, such as barrier materials, lightweight materials, energy, batteries, electronics, electrics, semiconductors, displays, home electronics, mobile phones, nano-industries, biotechnologies, polymer composites, metal composites, paints, pastes, inks, and the like, may be prepared. Further, according to the present invention, since a deoxygenation reaction under the supercritical condition is achieved at a significantly high rate, high quality graphene having high electrical conductivity may be prepared by a continuous process.

BRIEF DESCRIPTION OF DRAWINGS

FIG. 1 exemplarily shows an apparatus for preparing a graphene according to an exemplary embodiment of the present invention.

FIG. 2 exemplarily shows an apparatus for preparing a graphene according to an exemplary embodiment of the present invention.

FIG. 3 shows an infrared spectroscopy spectrum of graphenes obtained by Example 1 and Comparative Example 1 of the present invention.

FIG. 4 shows Raman spectrum of graphenes obtained by Example 1 and Comparative Example 1 of the present invention.

FIG. 5 shows scanning electron microscope (SEM) images of the graphenes obtained by Example 1 and Comparative Example 1 of the present invention.

FIG. 6 shows thermogravimetric measurement result of graphenes obtained by Example 1 and Comparative Example 1 of the present invention.

FIG. 7 shows XRD spectrum of a graphite oxide obtained by Preparation Example 1, the graphenes obtained by Example 1 and Comparative Example 1 of the present invention.

FIG. 8 shows transmission electron microscope (TEM) images of the graphenes obtained by Example 1 and Comparative Example 1 of the present invention.

FIG. 9 shows graph showing electrical conductivity of the graphenes obtained by Example 1 and Comparative Example 1 of the present invention.

DESCRIPTION OF EMBODIMENTS

A graphene of the present invention has 20 wt % or less of an oxygen content and 5 or more of a carbon/oxygen weight ratio (C/O ratio).

A method for preparing the graphene of the present invention includes forming a mixed solution including a graphite oxide, a solvent, a first oxidizing agent; and a sulfur compound or a nitrogen compound; forming the graphene by reacting the mixed solution under a subcritical condition or a supercritical condition of the solvent; and recovering the graphene.

In addition, an apparatus for preparing the graphene of the present invention includes: a mixing bath forming a pre-mixed solution by mixing a graphite oxide, a solvent, and a sulfur compound or a nitrogen compound; a pre-heater connected to a rear end of the mixing bath and preheating the pre-mixed solution supplied from the mixing bath; a first oxidizing agent feeding pump connected to a front end of the pre-heating solution and supplying the first oxidizing agent to the pre-heater; a reactor connected to a rear end of the pre-heater, and generating a reaction of the mixed solution under a subcritical condition or a supercritical condition of the solvent; a cooler connected to a rear end of the reactor and cooling a product of the reaction; and recovering baths connected to a rear end of the cooler and recovering the graphene from the product.

Terms such as first, second, and the like, used herein, are used for explaining various components, and these terms are used to distinguish one component from another component.

The terminology used herein is for the purpose of describing exemplary embodiments only and is not intended to be limiting the present invention. Singular forms are intended to include plural forms as well, unless the context clearly indicates otherwise. It will be further understood that the terms "comprises", "provides" and/or "has," when being used in this specification, specify the presence of stated features, numbers, steps, or components, or combinations thereof, but do not exclude the presence or addition of one or more other features, numbers, steps, components, or combinations thereof.

Although the present invention may be modified variously and have several embodiments, the exemplary embodiments are illustrated in the accompanying drawings and will be described in detail in the detailed description. However, the present invention is not limited to the specific embodiments and should be construed as including all the changes, equivalents, and substitutions included in the spirit and scope of the present invention.

Hereinafter, the present invention will be described in more detail.

According to an exemplary embodiment of the present invention, the graphene having 20 wt % or less of an oxygen content and 5 or more of a carbon/oxygen weight ratio (C/O ratio) is provided.

Specifically, the graphene of the present invention may have an oxygen content of 20 wt % or less, preferably, about 0.1 to about 15wt %, and more preferably, about 0.1 to 10 wt %.

As described above, since the oxygen content is low, the carbon/oxygen weight ratio, that is, the C/O ratio has a value of 5 or more which is higher than that of a commercial graphene, preferably, about 5 to about 20, and more preferably, about 10 to 15.

Since the graphene having the oxygen content and the C/O ratio in the above-described range has a small number of functional groups including the oxygen atom on a surface thereof, physical properties such as thermal conductivity, electrical conductivity, a barrier property, and the like, are excellent. Therefore, the graphene may be used in various industrial fields such as barrier materials, lightweight materials, energy, batteries, electronics, electrics, semiconductors, steel, displays, home electronics, mobile phones, nano-industries, biotechnologies, polymer composites, metal composites, paints, pastes, inks, water treatment, wastewater treatment, antistatic materials, electrostatic dispersion materials, conductive materials, electromagnetic wave shielding materials, electromagnetic wave absorbers, radio frequency (RF) absorbers, materials for solar cell, electrode materials for dye-sensitized-solar-cell (DSSC), electrical device materials, electronic device materials, semiconductor device materials, photoelectric device materials, notebook component materials, computer component materials, memory devices, mobile phone component materials, PDA component materials, PSP component materials, component materials for game machine, housing materials, transparent electrode materials, opaque electrode materials, field emission display (FED) materials, back light unit (BLU) materials, liquid crystal display (LCD) materials, plasma display panel (PDP) materials, light emitting diode (LED) materials, touch panel materials, electronic quotation board materials, billboard materials, display materials, heating elements, heat radiating elements, plating materials, catalysts, co-catalysts, oxidizing agents, reducing agents, automobile component materials, ship component materials, aircraft component materials, protective tape materials, adhesive materials, tray materials, clean room materials, transport component materials, flame retardant materials, antibacterial materials, metal composite materials, non-ferrous metal composite materials, materials for medical devices, building materials, flooring materials, materials for wallpaper, light source component materials, lamp materials, optical instrument component materials, materials for fabricating fibers, materials for manufacturing clothing, materials for electric products, materials for manufacturing electronic products, materials for secondary battery including cathode active materials for secondary battery, anode active materials for secondary battery and conductors for secondary battery, fuel cell materials, hydrogen storage material, and capacitor materials.

Meanwhile, a primary differential curve of the above-described graphene may have a peak at about 600 to about 850° C., or about 650 to about 750° C. in thermogravimetric analysis (TGA).

The primary differential curve means a curve obtained by differentiating weight loss curve (wt %) once in the thermogravimetric analysis (TGA). Accordingly, since a peak is generated at a temperature in which weight loss begins to occur and a maximum value is shown at a point in which a weight loss rate is maximal depending on temperature, a change rate of the weight loss rate depending on temperature may be easily observed.

Therefore, the peak of the primary differential curve shown at about 600 to about 850° C. means pyrolysis of the graphene at a temperature range of about 600 to about 850° C., which means that thermal stability is excellent as compared to a graphene pyrolyzed at about 400 to about 600° C., that is, the graphene having low degree of reduction or low purity.

The thermal stability is related with the functional group on the surface of the graphene, and in general, the more the functional group on the surface of the graphene is, the lower thermal stability is. The graphene according to an exemplary embodiment of the present invention shows high degree of reduction to have a small number of functional groups including the oxygen atom on the surface of the graphene, such that thermal stability may be excellent.

More specifically, the graphene according to an exemplary embodiment of the present invention is rarely pyrolyzed at a temperature less than about 600° C., such that at a temperature range less than about 600° C., weight loss is about 5% or less, and preferably, about 0.1 to about 5%, and at a temperature range of about 600 to about 900° C., weight loss is about 90% or more, and preferably, about 95 to about 99%.

In addition, the primary differential curve of the graphene may not have a peak at about 100 to about 300° C. in thermogravimetric analysis (TGA). The peak of the primary differential curve shown at about 100 to about 300° C. means pyrolysis of the graphene at the above-described temperature range, which is resulted from the pyrolysis of unpurified, amorphous carbon particles, graphite flakes, inorganic materials, or the like.

From the graphene according to an exemplary embodiment of the present invention, the amorphous carbon particles, the graphite flakes, inorganic materials, or the like, are effectively removed during the preparation process, and thus, these impurities are rarely included, and therefore, pyrolysis at about 100 to about 300° C. does not occur, such that the primary differential curve does not have a peak at the temperature range of about 100 to about 300° C.

In addition, the graphene may have a weight loss rate of about 90% or more, preferably, about 90 to about 99%, and more preferably, about 95 to about 99% at about 900° C. in thermogravimetric analysis.

In general, the graphene is completely decomposed by heat at about 900° C. or more; however, when impurities strong against heat, such as metal components, and the like, are included in the graphene, the graphene is not decomposed over the temperature, the weight loss rate is not increased by a predetermined level or more (about 90%).

The impurities such as the metal components, and the like, may be caused by graphite which is raw materials, or may be caused by compounds used in preparing graphite oxide from the graphite, or may be included by corrosion of reaction groups, and the like, in the preparation process.

However, in the graphene according to an exemplary embodiment of the present invention, impurities strong against heat, such as metal components, and the like are rarely included, such that the graphene is nearly completely decomposed at about 900° C. or more, such that the weight loss rate is about 90% or more, or about 95 to 99%.

In addition, a graphene according to another exemplary embodiment of the present invention may have an electrical conductivity of about 20 S/cm or more, preferably, about 20 S/cm to about 100 S/cm, and more preferably, about 25 to about 80 S/cm, when applying a pressure of about 4 kN to about 20 kN. As described above, the graphene has significantly excellent electrical conductivity, such that when the graphene is used as electrical materials, electronic materials, and the like, excellent devices may be manufactured.

In addition, the graphene according to another exemplary embodiment of the present invention has an $I_{2D}/I_G$ (intensity of 2D peak/intensity of G peak) value of about 0.15 or more, preferably, about 0.15 to about 0.4, and more preferably, about 0.25 to about 0.35, when analyzing Raman spectrum.

G peak of the graphene, which is a peak commonly shown in graphite-based materials, is shown at a range of about 1500 to about 1700 cm$^{-1}$. The G peak is caused by a mode in which hexagonal carbon atoms vibrate with adjacent atoms in an opposite direction so as to have symmetry of $E_{2g}$, wherein the vibrational mode is a Raman allowed case in which Raman scattering is allowed by the symmetry, which is observed in primary scattering. In general, when the number of graphene layers is small, weak intensity is observed.

D peak of the graphene, which is a peak shown at a range of about 1250 to about 1450 cm$^{-1}$, is caused by $A_1'$ vibrational mode in which hexagonal carbon atoms vibrate with atoms facing the carbon atoms in an opposite direction. This $A_1'$ vibrational mode is not observed in a lattice structure of a complete single-layered graphene due to the symmetry by Raman scattering, and when defects occur in the hexagonal structure or when an edge part of the graphene is exposed to the outside, the $A_1'$ vibrational mode is observed.

2D peak of the graphene, which is found at a range of about 2600 to about 2800 cm$^{-1}$, is caused by secondary scattering in which two photons are emitted, in the above-described $A_1'$ vibrational mode. Since two resonances are generated in the scattering process, such that the scattering refers to a double resonance Raman scattering, and due to an effect of the resonances, the scattering is significantly strongly shown in the spectrum.

In particular, the 2D peak is completely different between a single-layered graphene and a plural-layered graphene. In the single-layered graphene, the peak has a lorentzian line shape, that is, narrow width and strong intensity; meanwhile, in second or more layered graphene, a plurality of peaks are overlapped with each other to have a broad peak, and therefore, the single-layered graphene may be distinguished by the shape of peak.

In the method for preparing the graphene, the graphene is exfoliated from the graphite and particulated, such that as the number of the graphene layers to be exfoliated becomes decreased, an intensity of the G peak becomes decreased, and an intensity of the 2D peak becomes increased. Therefore, as the graphene is effectively exfoliated from the graphite, the $I_{2D}/I_G$ value is increased, and relative degree of exfoliation of the graphene may be evaluated by using the value.

A generally commercial graphene has an $I_{2D}/I_G$ value of about 0.1 to about 0.15; meanwhile, the graphene according to an exemplary embodiment of the present invention has an $I_{2D}/I_G$ value of about 0.15 or more, which is significantly high, and it means that the graphene of the present invention is effectively exfoliated as compared to the commercial graphene, such that the graphene present in the single-layered state has high content.

Meanwhile, the graphene of the present invention as described above may be obtained by the method for preparing the graphene by reacting a mixed solution including a graphite oxide, a solvent, a first oxidizing agent; and a sulfur compound or a nitrogen compound under a subcritical condition or a supercritical condition of the solvent to be described below, and the method will be described in more detail below.

The method for preparing the graphene according to another exemplary embodiment of the present invention includes forming the mixed solution including the graphite oxide, the solvent, the first oxidizing agent; and the sulfur compound or the nitrogen compound; forming the graphene by reacting the mixed solution under the subcritical condition or the supercritical condition of the solvent; and recovering the graphene.

According to an exemplary embodiment of the present invention, the sulfur compound may be represented by the following Chemical Formula 1, and the nitrogen compound may be represented by the following Chemical Formula 2:

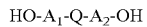  [Chemical Formula 1]

in Chemical Formula 1, $A_1$ and $A_2$ are each independently linear or branched C1-C10 alkylene group or C6-C20 arylene group, and Q is a sulfur atom (—S—) or a sulfone group(—(O=S=O)—), and

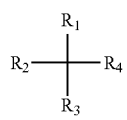  [Chemical Formula 2]

in Chemical Formula 2, at least one of $R_1$ to $R_4$ is a nitro group (—$NO_2$), and the remainder is hydrogen, linear or branched C1-C7 alkyl group or C6-C20 aryl group.

The graphene formed in the process of forming the graphene may be a graphene sheet or a graphene particle, wherein the graphene sheet refers to a sheet-shaped carbon structure formed of a single-layered structure separated from the graphite, and the graphene particle means a carbon structure in which the graphene sheets are overlapped and agglomerated with each other.

The preparation method may be more specifically explained in the following steps.

First, the pre-mixed solution including the graphite oxide, the solvent, and the sulfur compound or the nitrogen compound is formed. The pre-mixed solution may be a mixture in which the graphite oxide, and the sulfur compound or the nitrogen compound is dispersed in the solvent. Here, the graphite oxide dispersed in the solvent may have a single atom layer structure to a multiple atom layer structure in a flake shape.

In the graphite oxide, functional groups such as an epoxy group, a carboxyl group, a carbonyl group, a hydroxyl group, and the like, which are forms that carbon, the main component of the graphite, is oxidized, may be present to have hydrophilic property, such that the graphite oxide may have excellent dispersibility to water which may be included in the solvent, and may be easily dispersed into the solvent to be formed in a uniform mixture. Here, in order to effectively disperse the graphite oxide into the solvent, general dispersion methods using ultrasound, a homogenizer, and the like, may be used.

According to an exemplary embodiment of the present invention, the solvent may include water, carbon dioxide, or mixtures thereof. Water, carbon dioxide, or mixtures thereof in the solvent may be subcritical water or supercritical water, subcritical carbon dioxide or supercritical carbon dioxide under subcritical condition or supercritical condition, respectively, and may be reacted to form the graphene.

The graphite oxide included in the mixed solution may be formed by treating a graphite oxide precursor with an acid and a secondary oxidizing agent, and in this case, the graphite oxide may be formed by Hummers method which is generally used.

The secondary oxidizing agent, for example, peroxides such as permanganate, dichromate, chlorate, and the like, may be used without specific limitation, and when the graphite oxide precursor is treated with a strong acid such as sulfuric acid, nitric acid, hydrochloric acid, or the like, and a second oxidizing agent such as nitrate, permanganate, dichromate, chlorate, or the like, by Hummers method, the graphite oxide may be obtained. The graphite oxide formed thereby may have a hydrophilic property by the functional group present in the graphite as described above, and the solvent may be easily penetrated between planes, such that exfoliation may be easily performed. Therefore, at the time of stirring the pre-mixed solution in the uniform mixture form, the graphene oxide having a single atom layer structure and exfoliated from the graphite oxide may be obtained.

The graphite oxide precursor may be used without specific limitation as long as it is a material in which carbon is a main component as well as general graphite. For example, graphene, graphite nanoplatelet, graphene nanoplatelet, expanded graphite or expandable graphite, diamond, fullerene, carbon black, activated carbon, charcoal, carbon nanoribbon, carbon nanowire, carbon nanoclay, carbon nanotube, carbon fiber including pitch carbon fiber, and the like, carbon nano fiber, carbon glass fiber, asphalt, or mixtures thereof, and the like, may be used.

According to an exemplary embodiment of the present invention, the graphite oxide may be included in an amount about 0.0001 to about 30 parts by weight, preferably, about 0.01 to about 10 parts by weight, based on 100 parts by weight of the solvent. When the graphite oxide is included in an amount less than about 0.0001 parts by weight, an amount of the graphene to be capable of being prepared in a unit time is extremely small, such that economical feasibility may be deteriorated, and when the graphite oxide is included in an amount more than about 30 parts by weight, the graphite oxide may not be effectively exfoliated, and the reaction with a subcritical fluid or a supercritical fluid to be described below (that is, a deoxygenation reaction) may not be effectively performed, such that the graphene to be formed may have poor uniformity to deteriorate quality.

According to an exemplary embodiment of the present invention, the sulfur compound or the nitrogen compound may be included at about 0.0001 to about 1 molar ratio (M) with respect to the mixed solution. When the sulfur compound or the nitrogen compound is included at a molar ratio (M) less than about 0.0001, purification of the graphite oxide to be described below may not be effectively achieved, and when the sulfur compound or the nitrogen compound is included at a molar ratio (M) more than about 1, the graphene may be decomposed by excessive oxidation reaction, such that an amount of the graphene to be capable of being prepared may be decreased.

The pre-mixed solution may be injected into the reactor at a high-pressure in order to perform the subsequent reaction under the subcritical condition or the supercritical condition. The pressure applied at the time of injecting the pre-mixed solution into the reactor is not specifically limited, but preferably, may be about 30 atm to about 500 atm. When the pressure at the time of being injected is less than about 30 atm, the sulfur compound or the nitrogen compound is not converted into sulfuric acid or nitric acid, a purification effect may be reduced, and when the pressure is more than about 500 atm, in order to form excessive pressure, problems in which energy consumption is increased and aging of a preparation apparatus is accelerated may occur.

The first oxidizing agent including a gas mixture including oxygen and/or ozone, or the like; hydrogen peroxide; or mixtures thereof, or the like, may be injected into the pre-mixed solution injected into the reactor at a high pressure to form the mixed solution.

The mixed solution formed thereby may be pre-heated to a temperature of about 50 to about 500° C., and preferably about 50 to about 400° C. by a pre-heating step. Through the pre-heating process, the reactor may be maintained at a predetermined temperature.

The pre-heated mixed solution may reach at the subcritical state or the supercritical state by a heating process and a pressing process. The sulfur compound or the nitrogen compound in the subcritical state or the supercritical state may be converted into sulfuric acid or nitric acid, respectively, by an oxidation reaction with the injected first oxidizing agent. When the sulfur compound is thiodiglycol, the conversion reaction may be represented by the following Reaction Formula 1, and when the nitrogen compound is nitromethane, the conversion reaction may be represented by Reaction Formula 2:

[Reaction Formula 1]

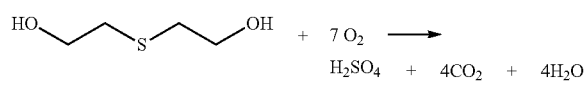

[Reaction Formula 2]

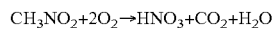

The graphite oxide may be purified by the sulfuric acid or the nitric acid formed as described above, and may be purified from impurities such as amorphous carbon particles, non-oxidized graphite flakes, graphene oxides in tens of nanometer or less, other residues, and the like, which may be included in the mixed solution, such that the graphene to be formed later may have improved quality. Specifically, the sulfuric acid or the nitric acid prepared in the reactor may dissolve organic or inorganic impurities, and may decompose and combust the amorphous carbon, extremely small materials present in the graphene oxide, such as the graphene oxide in tens of nanometer or less, graphite flakes, or the like. The impurities such as the amorphous carbon, the graphene oxide, the graphite flakes, or the like, may be decomposed into carbon dioxide by the oxidizing agent such as oxygen, and in particular, may be rapidly decomposed in the presence of the sulfuric acid or the nitric acid, such that the graphene including impurities may be purified by the process.

In addition, the Chemical reactions represented by Reaction Formula 1 or 2 is generated in a moment under the reaction condition in the reactor, such that corrosion of the reactor, and the like, caused by the sulfuric acid or the nitric acid to be prepared may be effectively prevented, and the content of the impurities which may be included in the prepared graphene by the corrosion may be more decreased.

The solvent included in the mixed solution may be a subcritical fluid or a supercritical fluid under this condition, and when water or carbon dioxide is included in the solvent, each of water or carbon dioxide may reach at a subcritical water state or a supercritical water state, or a subcritical carbon dioxide state or a supercritical carbon dioxide state in this state, respectively.

The graphene oxide present as being exfoliated in the mixed solution may generate a reaction (a deoxygenation reaction) with the subcritical fluid or the supercritical fluid to be reduced, thereby forming the graphene.

According to an exemplary embodiment of the present invention, the subcritical condition or the supercritical condition may have a temperature of about 50 to about 600° C., preferably, about 200 to about 500° C. When the temperature is less than about 50° C., reducing force of the subcritical fluid or the supercritical fluid is deteriorated, such that the deoxygenation reaction of the exfoliated graphene oxide may not be effectively performed, and when the temperature is more than about 600° C., economical feasibility may be deteriorated due to the cost for maintaining high temperature condition.

According to an exemplary embodiment of the present invention, a pressure of the subcritical condition or the supercritical condition may be about 30 to about 500 atm, preferably, about 100 to about 500 atm. When the pressure is less than about 30 atm, a conversion rate of sulfur compound or the nitrogen compound into the sulfuric acid or the nitric acid is low, such that the purification process may not be effectively performed, and reducing force of the subcritical fluid or the supercritical fluid is deteriorated, such that the deoxygenation reaction of the exfoliated graphene oxide may not be effectively performed, and when the pressure is more than about 500 atm, economical feasibility may be deteriorated due to the cost for maintaining high-pressure condition.

According to an exemplary embodiment of the present invention, the reaction (deoxygenation reaction) between the graphite oxide and the subcritical fluid or the supercritical fluid may be performed in the presence of a reducing adjuvant. As the reducing adjuvant, generally used reducing agents or reducing adjuvants may be used without specific limitation. For example, at least one kind selected from the group consisting of an ammonia water, an amine compound such as dialkyl amine, trialkyl amine, dialkyl hydroxylamine, or the like, an inorganic salt such as sodium hydroxide (NaOH), potassium hydroxide (KOH), sodium hydrogen carbonate ($NaHCO_3$), or the like, sodium hydride (NaH), sodium borohydride ($NaBH_4$), lithium aluminum hydride ($LiAlH_4$), hydroquinone (HO—Ph—OH), hydrogen sulfide (HS), urea ($NH_2$—CO—$NH_2$), urea sulfide ($NH_2$—CS—$NH_2$), and sulfide dioxide urea ($NH_2$—C(NH)—SOOH), may be used as the reducing adjuvant; however, the present invention is not limited thereto, and alkaline reducing agents generally used in the technical field to which the present invention pertains may be used without specific limitation.

The reducing adjuvant may generate an acid-base neutralization reaction with the sulfuric acid or the nitric acid primarily prepared in the reactor. The sulfuric acid or the nitric acid prepared in the reactor in the reaction condition has significantly strong reactivity, such that there is a risk of oxidizing the apparatus when the sulfuric acid or the nitric acid is present in the reactor for a long time. Therefore, the injected reducing adjuvant may neutralize the sulfuric acid or the nitric acid remaining after the purification process is performed to prevent damage of the apparatus.

In addition, the reducing adjuvant may further increase reducing force in the reaction (deoxygenation reaction) between the graphene oxide and the subcritical water or the supercritical water or the subcritical carbon dioxide or the supercritical carbon dioxide, such that the graphene oxide may be easily reduced into the graphene. As a result, a pi bond in the graphene oxide may be recovered to obtain high quality graphene having high C/O ratio.

Then, in the recovering of the formed graphene, the graphene formed by the reaction may be separated and recovered from the mixture including the solvent. The separating process may be performed by methods such as a drying method, centrifugation, filtration, and the like, of the mixed solution including the solvent, and the like, and any method for separating the prepared graphene from the mixed solution may be used without specific limitation.

According to an exemplary embodiment of the present invention, a process of high-pressure-filtering the formed graphene may be further included after the process of forming the graphene and before the process of recovering the graphene. The graphene with high purity may be more effectively separated by the filtering process at high-pressure in which the pressure of the reaction condition is not reduced as described above.

According to another exemplary embodiment of the present invention, after the process of forming the graphene and before the process of recovering the graphene, a process of washing the formed graphene may be further included in the filtering process. Distilled water is high-pressure injected and supplied into a high-pressure filter used in the filtering process, such that the washing process may be continuously performed, and impurities such as the solvent, and the like, which may remain in the graphene may be effectively removed by the washing process.

In addition, the apparatus for preparing the graphene according to an exemplary embodiment of the present invention includes a mixing bath forming a pre-mixed solution by mixing a graphite oxide, a solvent, and a sulfur compound or a nitrogen compound; a first oxidizing agent feeding pump supplying a first oxidizing agent; a pre-heater pre-heating the pre-mixed solution and the first oxidizing agent supplied from the mixing bath and the first oxidizing agent feeding pump, respectively; a reactor connected to a rear end of the pre-heater, and generating a reaction of the mixed solution including the pre-mixed solution and the first oxidizing agent under a subcritical condition or a supercritical condition of the solvent; a cooler connected to a rear end of the reactor and cooling a product of the reaction; and recovering baths connected to a rear end of the cooler and recovering the graphene from the product.

FIGS. 1 and 2 exemplarily show an apparatus for preparing a graphene according to an exemplary embodiment of the present invention.

Referring to FIGS. 1 and 2, the apparatus for preparing the graphene according to an exemplary embodiment of the present invention includes a mixing bath 100 forming a pre-mixed solution by mixing a graphite oxide, a solvent, and a sulfur compound or a nitrogen compound; a first oxidizing agent feeding pump 13 supplying a first oxidizing agent; a pre-heater 200 pre-heating the pre-mixed solution and the first oxidizing agent supplied from the mixing bath 100 and the first oxidizing agent feeding pump 13, respectively; a reactor 300 connected to a rear end of the pre-heater 200, and generating a reaction of the mixed solution including the pre-mixed solution and the first oxidizing agent under a subcritical condition or a supercritical condition of the solvent; a cooler 16 connected to a rear end of the reactor 300 and cooling a product of the reaction; and a recovering bath 510 connected to a rear end of the cooler 16 and recovering the graphene from the product. In addition, the apparatus may further include a cooling and pressure-releasing bath 400 provided between the cooler and the recovering bath, and capable of cooling and pressure-releasing the product to a temperature and a pressure appropriate for recovering the product.

For example, the reaction generated in the serial and continuous apparatus is as follows. The pre-mixed solution is formed in the mixing bath 100, and the pre-mixed solution is delivered to the pre-heater 200 by a high-pressure feeding pump 12. The first oxidizing agent is injected into the pre-heater 200 by the first oxidizing agent feeding pump 13 to form the mixed solution in which the first oxidizing agent and the pre-mixed solution are mixed with each other. The mixed solution is pre-heated in the pre-heater 200 to a temperature of about 50 to about 500° C., and delivered to the reactor 300. In the reactor 300, the above-described reaction is performed in the method for preparing the graphene. The graphene formed by the reaction is delivered to the cooler 16, cooled in the cooler 16 and/or the cooling and pressure-releasing bath 400 to a temperature of about 20 to about 50° C., and recovered in the recovering baths 510, 511, and 512.

The apparatus for preparing the graphene of the present invention may further include a circulating pump 11 connected to the mixing bath 100, and circulating and mixing the graphite oxide, the solvent, and the sulfur compound or the nitrogen compound to form the pre-mixed solution. The pre-mixed solution mixed in the mixing bath 100 is passed through the circulating pump 11 and returns to the mixing bath to be uniformly mixed, and may be put into the pre-heater 200 in a state in which the pre-mixed solution is more appropriate for the reaction.

According to an exemplary embodiment of the present invention, the apparatus for preparing the graphene may further include a reducing adjuvant feeding pump 15 connected to the middle of the reactor 300 and injecting the reducing adjuvant into the reactor 300.

The reducing adjuvant feeding pump 15 may be connected to the middle of the reactor 300. For example, the reducing adjuvant feeding pump may be connected to a point of about ⅙ to about ½ from an entrance of the reactor 300, preferably, may be connected to a point of about ⅓ from the entrance of the reactor 300, such that the reducing adjuvant may be injected into the reactor 300. As the reducing adjuvant is injected at a point of about ⅓ from an entrance of the reactor 300, as described above, sufficient purification may be achieved by prepared sulfuric acid and the nitric acid before the reducing adjuvant is injected, and the sulfuric acid and the nitric acid are neutralized by the reducing adjuvant injected by the reducing adjuvant feeding pump 15, such that the apparatus may be prevented from being exposed to strong acid for a long time. In addition, the reducing adjuvant remaining after the neutralization may participate in the deoxygenation reaction to increase reducing force.

According to another exemplary embodiment of the present invention, the apparatus for preparing the graphene may further include a heat exchanger 14 provided between the mixing bath 100 and the pre-heater 200, and connected to the rear end of the reactor 300 and a front end of the cooler 16. The heat exchanger 14 may deliver heat of the product obtained after the reaction is completed in the reactor 300 to the mixed solution of the pre-heater 200. The product obtained after the reaction is completed in the reactor 300 is passed through the heat exchanger 14, and is cooled to a temperature of about 150 to about 300° C. while delivering heat to the pre-heater 200 through the heat exchanger 14, and at the same time, in the pre-heater 200, pre-heating may be performed by using the delivered heat. Energy required for cooling the product and pre-heating the reactant may be reduced by heat-exchange generated by the heat exchanger 14.

According to an exemplary embodiment of the present invention, the recovering baths 511 and 512 of the apparatus for preparing the graphene may further include filters 501 and 502 filtering the product delivered from the cooler.

The filters 501 and 502 may include a high-pressure filter. The product cooled after the reaction is completed in the reactor 300 is passed through the filters 501 and 502 in a high-pressure state to achieve the high-pressure filtering process, and by the high-pressure filtering process in the filters 501 and 502, graphene with high purity may be more effectively separated. The high-pressure filter may have separate pressure controllers 18 and 19 attached therewith, and filtering pressure may be appropriately controlled by the pressure controllers.

In addition, the filters 501 and 502 may be connected to a distilled water feeding pump 20. The product may be washed by high-pressure injecting distilled water into the high-pressure filter through the distilled water feeding pump 20, and impurities such as the solvent, and the like, which may remain in the graphene may be effectively and easily removed by the washing process.

Hereinafter, functions and effects of the present invention will be described in detail by specific examples of the present invention. Meanwhile, the Examples are provided only to illustrate the present invention, and the scope of the invention is not limited thereto.

EXAMPLE

Preparation of Graphite Oxide

Preparation Example 1

A graphite oxide was prepared by Hummers method.

10 g of graphite and 5 g of sodium nitrate were mixed and stirred in 2 L 3-neck round bottom flask at 0° C., and 250 ml of 98% sulfuric acid was slowly and drop-wisely added. The mixture was slowly stirred for 2 hours while maintaining a temperature of 5° C. After 2 hours, 40 g of potassium permanganate was slowly injected while maintaining a temperature of 35° C. 500 ml of distilled water was slowly and drop-wisely added while stirring the mixture at high speed, then, 36 ml of 3% hydrogen peroxide aqueous solution was drop-wisely added, 275 ml of 3% hydrochloric acid solution was drop-wisely added, and the obtained mixture was filtered and washed with 900 ml of 3% hydrochloric acid solution and then washed with 3 L of distilled water. The washed filter cake was dried in vacuum oven at 40° C. for 24 hours to obtain graphite oxide.

Preparation of Graphene

Example 1

Graphene was prepared by using an apparatus shown in FIG. 2.

First, 10 g of the graphite oxide prepared by Preparation Example 1 and 977.8 g of distilled water were put into the mixing bath 100, and 12.2 g (0.1M) of thiodiglycol was added while being stirred, then circulated by the circulating pump 11 to prepare a pre-mixed solution containing the thiodiglycol. The pre-mixed solution was put into the pre-heater 200 by the high-pressure feeding pump 12 at a flow velocity of 30 g/min, and oxygen in a gas state compressed to 245 to 252 atm was put into the pre-mixed solution from a front end of the heat exchanger 14 at a flow velocity of 0.7 g/min to prepare the mixed solution. The prepared mixed solution was delivered to the pre-heater 200 by the heat exchanger 14 and pre-heated in the pre-heater 200 to a temperature of 220 to 280° C.

The pre-heated mixed solution was injected into the reactor 300 for purification in the subcritical water state having a temperature of 300 to 330° C., and a pressure of 230 atm to 250 atm. 30% ammonia water as the reducing adjuvant was injected into a point of ⅓ from an entrance of the reactor 300 by the reducing adjuvant feeding pump 15 at a flow velocity of 1.05 g/min, and the purified graphene oxide was reduced. The purified and reduced product was transferred into the heat exchanger 14 again and primarily cooled to 200° C., and cooled to 26° C. through the cooler 16 again. The cooled resultant product was filtered by filters 501 and 502. Here, the product was continuously washed while injecting distilled water by the distilled water feeding pump 20, then the pressure was released to 1 atm by pressure controllers 18 and 19, and the obtained graphene compound was recovered in recovering baths 511 and 512 including the filters. 5.1 g of graphene was obtained by the continuous process.

Example 2

The same process as Example 1 was performed except that 0.61 g of 0.1M nitromethane was added instead of using thiodiglycol and oxygen was injected at a flow velocity of 0.2 g/min, to obtain 5.7 g of graphene in Example 2.

Example 3

The same process as Example 1 was performed except that ammonia water was not injected as the reducing adjuvant, to obtain 5.5 g of graphene in Example 3.

Example 4

The same process as Example 2 was performed except that ammonia water was not injected as the reducing adjuvant, to obtain 5.6 g of graphene in Example 4.

Comparative Example 1

10 g of the graphite oxide prepared by Preparation Example 1 was heat treated in an electric furnace of 300 to 400° C. for 2 minutes to obtain 8.4 g of graphene.

Results thereof were summarized and shown in the following Table 1.

TABLE 1

| | Nitrogen Compound | Sulfur Compound | Oxygen Injection | Reducing adjuvant (Ammonia Water) | Amount of Obtained Graphene (g) |
|---|---|---|---|---|---|
| Example 1 | — | Thiodiglycol (0.1M) 12.2 g | 0.7 g/min | Included | 5.1 |
| Example 2 | Nitromethane (0.1M) 0.61 g | — | 0.2 g/min | Included | 5.7 |
| Example 3 | — | Thiodiglycol (0.1M) 12.2 g | 0.7 g/min | — | 5.5 |
| Example 4 | Nitromethane (0.1M) 0.61 g | — | 0.2 g/min | — | 5.6 |
| Comparative Example 1 | — | — | — | — | 8.4 |

Referring to Table 1 above, the largest amount of product was obtained in Comparative Example 1. The reason is because reduction was not effectively performed in the graphene obtained by Comparative Example 1, such that a large content of oxygen was contained.

FIG. 5 shows scanning electron microscope (SEM) images of the graphenes obtained by Example 1 and Comparative Example 1 of the present invention.

Referring to FIG. 5, it could be appreciated that in Comparative Example 1, the graphene was rarely exfoliated, a layered structure of the graphite was maintained as it is; meanwhile, in Example 1, the graphene was exfoliated from the graphite, such that the layered structure was rarely observed. That is, it could be appreciated that the graphene was more effectively exfoliated from the graphite and produced in Example 1 as compared to Comparative Example 1.

Experimental Example

Element Analysis

Elements of the graphenes obtained by Examples 1 to 4, and Comparative Example 1 were analyzed by elemental analyzer, and results thereof were summarized in the following Table 2.

TABLE 2

| Sample | Oxygen [wt %] | Carbon [wt %] | Hydrogen [wt %] | Sulfur [wt %] | C/O ratio |
|---|---|---|---|---|---|
| Example 1 | 7.8 | 89.9 | 0.7 | 1.2 | 11.6 |
| Example 2 | 8.1 | 88.1 | 1.0 | 0.0 | 10.9 |
| Example 3 | 14.8 | 83.5 | 0.8 | 0.7 | 5.6 |
| Example 4 | 16.0 | 82.1 | 1.0 | 0.7 | 5.1 |
| Comparative Example 1 | 22.5 | 69.8 | 1.8 | 2.6 | 3.1 |

Referring to Table 2 above, it could be confirmed that in Examples 1 to 4, the oxygen content was about 20 wt % or less, which is smaller than 22.5 wt % of Comparative Example 1. In addition, it could be confirmed that in Examples 1 to 4, the C/O value was about 5 or more according to low oxygen content, which is larger than 3.1 of Comparative Example 1.

It means that in Examples of the present invention, the reduction reaction was effectively achieved, such that the functional groups having oxygen present on the surface of the graphene (or the graphite) were effectively removed.

In particular, Examples 1 and 2 had significantly small oxygen content and high C/O value as compared to Comparative Example, which is considered that this comes from an effect of the reducing adjuvant which is additionally added in Examples.

In addition, it could be confirmed that in Examples 1 to 4, a sulfur atom content was also smaller than that of Comparative Example 1, which means that the functional groups including sulfur present on the surface of the graphene (or the graphite) are also effectively removed by the reduction reaction.

Accordingly, it could be expected that the graphenes of Examples 1 to 4 had purity higher than that of the graphene of Comparative Example 1, and had excellent electrical properties such as electrical conductivity, and the like.

Infrared Spectrometry Spectrum Measurement

Infrared spectrometry spectrum was measured by using the graphenes obtained by Example 1 and Comparative Example 1. Results obtained by the measurement were shown in FIG. 3.

Referring to FIG. 3, it was observed that a peak at 3300 $cm^{-1}$ of a hydroxy group, a peak at 1760 $cm^{-1}$ of a carbonyl group, a peak at 1130 $cm^{-1}$ of a C—O bond and an epoxy group shown in Comparative Example 1 were remarkably decreased in Example 1, such that it could be appreciated that reduction or the deoxygenation reaction was effectively achieved in Example 1.

Raman Spectrum Measurement

Raman spectrum was measured by using the graphenes obtained by Example 1 and Comparative Example 1, and results obtained by the measurement were shown in FIG. 4.

Referring to FIG. 4, 2D peak could be observed around about 2600 to about 2800 $cm^{-1}$ in Example 1, which is not shown in Comparative Example 1. In addition, it could be confirmed that in Example 1, $I_{2D}/I_G$ value was about 0.31; meanwhile, in Comparative Example 1, $I_{2D}/I_G$ value was merely about 0.12, which means that Examples 1 had a single-layered graphene content higher than that of Comparative Example 1.

Thermogravimetric Measurement

Thermogravimetric measurement was conducted by using the graphenes obtained by Example 1 and Comparative Example 1, and results obtained by the measurement were shown in FIG. 6.

Referring to FIG. 6, it could be confirmed that weight loss was shown around 200° C. in Comparative Example 1.

The weight loss is caused by pyrolysis of impurities such as unpurified, amorphous carbon, small graphite flakes, and the like, and it could be appreciated that the above-mentioned impurities in a large amount are present in the graphene prepared by Comparative Example 1.

Meanwhile, it could be confirmed that in Example 1, weight loss was not shown around 200° C., and therefore, it could be appreciated that impurities present in Comparative Example 1 were effectively removed by the preparation method of the present invention.

In addition, it could be confirmed that in Comparative Example 1, an inflection peak by the primary differentiation of thermogravimetric curve, that is, an inflection temperature peak was shown around about 500° C. It means that the graphite oxide is not effectively reduced, such that thermal stability is not excellent.

Meanwhile, it could be confirmed that in Example 1, the inflection temperature peak was shown at only about 750° C. or more, and weight loss was not shown at a temperature lower than about 750° C., and therefore, it could be appreciated that according to the method for preparing the graphene of the present invention, purification and reduction reactions were effectively performed, such that the prepared graphene had relatively increased thermal stability.

Meanwhile, it could be confirmed that in Comparative Example 1, weight loss did not occur at about 900° C., and weight loss rate remained at a level of about 80%, which means that impurities components strong against heat, such as metal, and the like, are included in a large amount.

Meanwhile, it could be confirmed that in Example 1, weight loss rate at a temperature of about 900° C. or more reached at about 100%, which means that the above-mentioned impurity components, and the like, are not included, such that complete pyrolysis is achieved at the above-mentioned temperature range or more, and the graphene of Example 1 had purity higher than that of the graphene of Comparative Example 1.

XRD Measurement

X-ray diffraction (XRD) was measured by using the graphenes obtained by Example 1 and Comparative Example 1, and results obtained by the measurement were shown in FIG. 7.

Referring to FIG. 7, it could be observed that in Example 1, 2θ=11° peak which is a typical peak of the graphite oxide was rarely shown and but a peak was shown in 2θ=about 21 to about 26° corresponding to 100 plane peak of the graphene. Meanwhile, it could be appreciated that in Comparative Example 1, a decrease in a size of the 2θ=11° peak was smaller than that of Example 1 and a size of the 100 plane peak was not large, either, such that effective reduction and exfoliation were not performed.

TEM Measurement

TEM images of the exfoliated graphene single layers obtained by Example 1 and Comparative Example 1 of the present invention were shown in FIG. 8.

Referring to FIG. 8, it could be confirmed that in Comparative Example 1, dark spot particles were observed in dotted circle. These spot particles were impurities such as unpurified, amorphous carbon particles, small graphite flakes, inorganic materials, and the like, and it could be confirmed that when preparing the graphene by existing methods, impurities were not effectively removed.

However, it could be confirmed that in Example 1, dark spot particles observed in Comparative Example were rarely observed, which could be interpreted that the graphene effectively purified from the impurites was prepared.

Electrical Conductivity Measurement

Electrical conductivity was measured by using the graphenes obtained by Example 1 and Comparative Example 1. Each sample was vacuum dried at 50° C. for 24 hours, and prepared as a powder state, and electrical conductivity was measured by four terminal method in a state of applying a pressure of about 4 kN to about 20 kN. In the measurement, condition in which temperature was about 5 to about 40° C. and humidity was 50% or less was maintained.

FIG. 9 shows graph showing electrical conductivity measured by the above-described method.

Referring to FIG. 9, it could be confirmed that in Comparative Example 1, electrical conductivity was about 5 to about 18 S/cm; meanwhile, in Example 1, electrical conductivity was about 25 to about 80 S/cm. That is, it could be confirmed that in Example 1, the graphene was effectively purified, reduced, and exfoliated to have excellent electrical conductivity as compared to Comparative Example 1, and therefore, the graphene of Example 1 is more effectively usable for electrical devices, and the like.

DESCRIPTION OF REFERENCE NUMERALS

11: CIRCULATING PUMP
12: HIGH PRESSURE FEEDING PUMP
13: FIRST OXIDIZING AGENT FEEDING PUMP
14: HEAT EXCHANGER
15: REDUCING ADJUVANT FEEDING PUMP
16: COOLER
17, 18, 19: PRESSURE CONTROLLER
20: DISTILLED WATER FEEDING PUMP
100: MIXING BATH
200: PRE-HEATER
300: REACTOR
400: COOLING AND PRESSURE-RELEASING BATH
501, 502: FILTER
510, 511, 512: RECOVERING BATH

The invention claimed is:

1. A method for preparing a graphene comprising:
   forming a mixed solution including a graphite oxide, a solvent, a first oxidizing agent; and a sulfur compound or a nitrogen compound;
   forming the graphene by reacting the mixed solution under a subcritical condition or a supercritical condition of the solvent; and
   recovering the graphene
   wherein the sulfur compound is represented by the following Chemical Formula 1, and the nitrogen compound is represented by the following Chemical Formula 2:

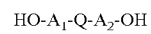
[Chemical Formula 1]

in Chemical Formula 1, A1 and A2 are each independently linear or branched C1-C10 alkylene group or C6-C20 arylene group, and Q is a sulfur atom (—S—) or a sulfone group (—(O=S=O)—), and

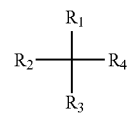
[Chemical Formula 2]

in Chemical Formula 2, at least one of R1 to R4 is a nitro group (—NO2), and the remainder is hydrogen, linear or branched C1-C7 alkyl group or C6-C20 aryl group.

2. The method of claim 1, wherein the solvent includes water, carbon dioxide, or mixtures thereof.

3. The method of claim 1, wherein the graphite oxide is formed by treating a graphite oxide precursor with an acid and a second oxidizing agent.

4. The method of claim 3, wherein the graphite oxide precursor is at least one kind selected from the group consisting of graphite, graphene, graphite nanoplatelet, graphene nanoplatelet, expanded graphite, diamond, fullerene, carbon black, activated carbon, charcoal, carbon nanoribbon, carbon nanowire, carbon nanoclay, carbon nanotube, pitch carbon fiber, carbon nanofiber, carbon glass fiber, and asphalt.

5. The method of claim 1, wherein the first oxidizing agent is at least one kind selected from the group consisiting of oxygen, ozone, and hydrogen peroxide.

6. The method of claim 1, wherein the graphite oxide is included in an amount of 0.0001 to 30 parts by weight based on 100 parts by weight of the solvent.

7. The method of claim 1, wherein the nitrogen compound or the sulfur compound is included at 0.0001 to 1 molar ratio (M) with respect to the mixed solution.

8. The method of claim 1, wherein the subcritical condition or the supercritical condition has a temperature of 50 to 600° C.

9. The method of claim 1, wherein the subcritical condition or the supercritical condition has a pressure of 30 to 500 atm.

10. The method of claim 1, wherein in the forming of the graphene, the mixed solution further including a reducing adjuvant is reacted under the subcritical condition or the supercritical condition.

11. The method of claim 10, wherein the reducing adjuvant is at least one selected from the group consisting of an ammonia water, amine, sodium hydroxide (NaOH), potassium hydroxide (KOH), sodium hydrogen carbonate (NaHCO3), sodium hydride (NaH), sodium borohydride (NaBH4), lithium aluminum hydride (LiAlH4), hydroquinone (HO—Ph—OH), hydrogen sulfide (HS), urea (NH2-CO—NH2), urea sulfide (NH2-CS—NH2), and sulfide dioxide urea (NH2-C(NH)—SOOH).

12. The method of claim 1, further comprising, after the forming of the mixed solution and before the forming of the graphene, pre-heating the mixed solution to 50 to 500° C.

13. The method of claim 1, further comprising, after the forming of the graphene and before the recovering of the graphene, high-pressure-filtering the graphene.

14. The method of claim 1, further comprising, after the forming of the graphene and before the recovering of the graphene, washing the formed graphene.

15. An apparatus for preparing a graphene comprising:
a mixing bath forming a pre-mixed solution by mixing a graphite oxide, a solvent, and a sulfur compound or a nitrogen compound;
a first oxidizing agent feeding pump supplying a first oxidizing agent;
a pre-heater pre-heating the pre-mixed solution and the first oxidizing agent supplied from the mixing bath and the first oxidizing agent feeding pump, respectively;
a reactor connected to a rear end of the pre-heater, and generating a reaction of a mixed solution including the pre-mixed solution and the first oxidizing agent under a subcritical condition or a supercritical condition of the solvent;
a cooler connected to a rear end of the reactor and cooling a product of the reaction;
recovering baths connected to a rear end of the cooler and recovering the graphene from the product; and
a reducing adjuvant feeding pump connected to the middle of the reactor and injecting a reducing adjuvant into the reactor,
wherein the reducing adjuvant feeding pump is connected to a point of ⅙ to ½ from an entrance of the reactor.

16. The apparatus of claim 15, further comprising a circulating pump connected to the mixing bath, and circulating and mixing the graphite oxide, the solvent, and the sulfur compound or the nitrogen compound to form the pre-mixed solution.

17. The apparatus of claim 15, further comprising a heat exchanger provided between the mixing bath and the pre-heater, and connected to the rear end of the reactor and a front end of the cooler.

18. The apparatus of claim 15, further comprising a cooling and pressure-releasing bath provided between the cooler and the recovering bath, and cooling and pressure-releasing the product.

19. The apparatus of claim 15, wherein the recovering bath further includes filters filtering the product delivered from the cooler.

* * * * *